Patented Mar. 11, 1952

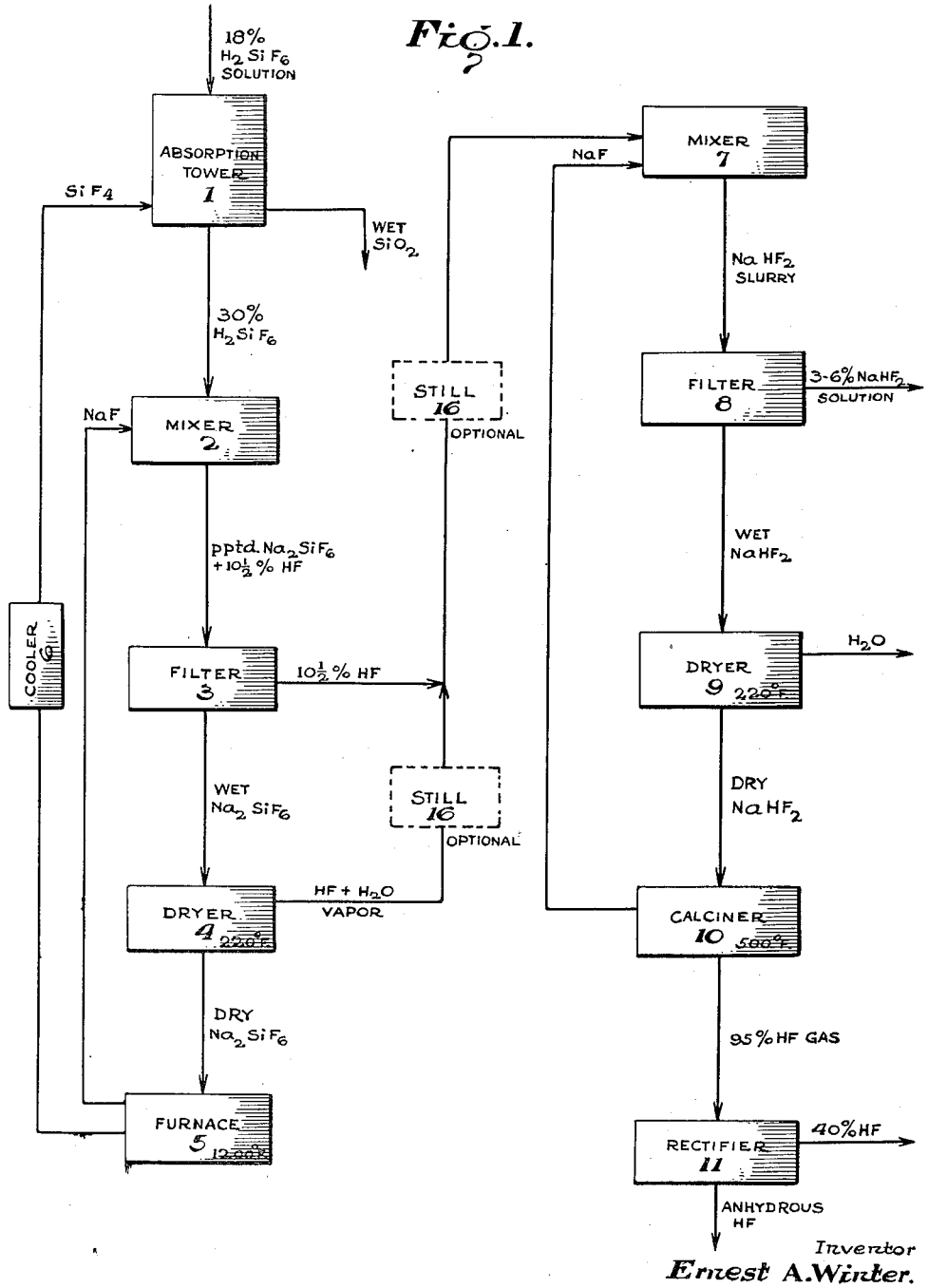

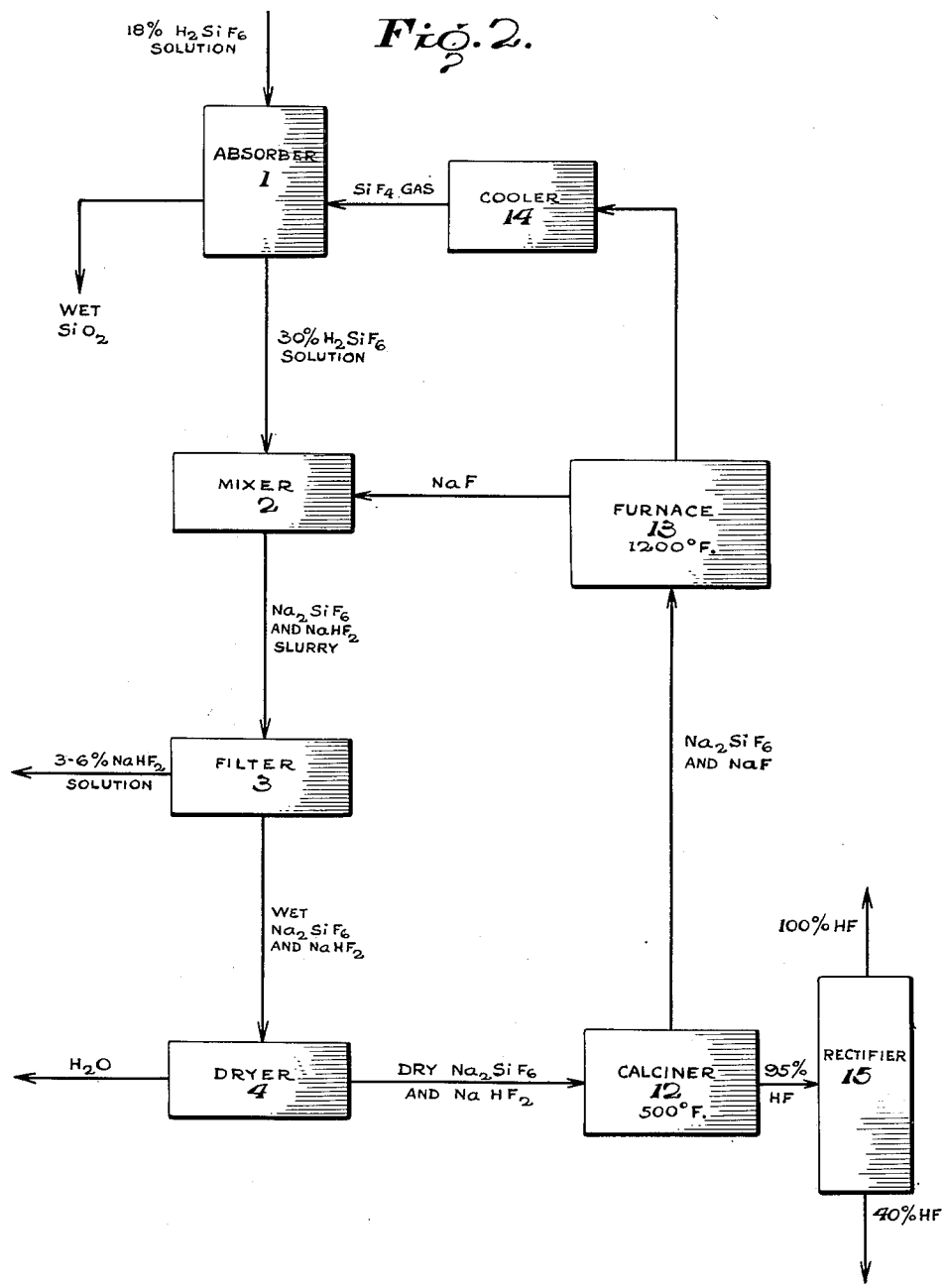

2,588,786

UNITED STATES PATENT OFFICE 2,588,786

PROCESS FOR PRODUCING ESSENTIALLY SILICON - FREE HYDROFLUORIC ACID FROM HYDROFLUOSILICIC ACID

Ernest A. Winter, College Park, Ga., assignor to Tennessee Corporation, New York, N. Y., a corporation of New York Application June 23, 1948, Serial No. 34,716

8 Claims. (Cl. 23—153)

This invention relates to the production of essentially silicon-free fluorine compounds and more particularly to the production of such compounds from hydrofluosilicic acid ($H_2SiF_6$). More particularly this invention relates to the production of concentrated fluorine compounds from dilute hydrofluoric acid (HF) solutions.

The process of the present invention may employ hydrofluosilicic acid as the starting compound and employs $Na_2SiF_6$, NaF and $H_2O$ at different stages in the process to produce concentrated and/or anhydrous HF; sodium bifluoride ($NaHF_2$); sodium fluosilicate ($Na_2SiF_6$); and sodium fluoride (NaF).

Heretofore such essentially silicon-free fluorine compounds have been prepared from fluorspar and sulphuric acid. This fluorspar must be of high grade and substantially free of impurities to produce the desired end products. Deposits of this fluorspar are now being depleted and the process of the present invention makes use of a hitherto waste product, $H_2SiF_6$, to produce these compounds on a competitive basis with known commercial processes. $H_2SiF_6$ is a by-product and is recovered from waste gases generated in superphosphate manufacture.

It is accordingly an object of the present invention to produce essentially silicon-free fluorine compounds from hydrofluosilicic acid.

Another object of the present invention is to produce concentrated fluorine compounds from dilute hydrofluoric acid solutions.

Another object of the present invention is to produce concentrated and/or anhydrous hydrofluoric acid from hydrofluosilicic acid.

Another object of the present invention is to produce concentrated and/or anhydrous hydrofluoric acid from dilute hydrofluoric acid.

Another object of the present invention is to produce sodium bifluoride from hydrofluosilicic acid.

Another object of the present invention is to produce sodium fluosilicate and sodium fluoride from hydrofluosilicic acid.

Another object of the present invention is to produce sodium bifluoride from dilute hydrofluoric acid.

Another object of the present invention is to produce essentially silicon-free fluorine compounds from hydrofluosilicic acid without employing expensive raw materials.

Another object of the present invention is to produce essentially silicon-free fluorine compounds from hydrofluosilicic acid by processes in which by-products may be recycled in such processes to reduce the cost of the raw materials employed therein.

Other and further objects of the present invention will appear from the following description.

In the accompanying drawings,

Fig. 1 is a flow sheet of an illustrative embodiment of the process of the present invention; and Fig. 2 is a flow sheet of a modification of the process of the embodiment of Fig. 1.

It is well known to the art that hydrofluoric acid and water form a constant boiling mixture which contains approximately 38% HF and 62% $H_2O$. If such a solution has less than 38% HF it cannot be fractionated to give a higher strength than 38%. If such a solution has approximately 80% HF it can be fractionated to yield substantially 100% HF gas and a liquid residue of 40–50% HF. In the following description of my invention when I refer to dilute HF solutions I mean solutions having an HF content of less than that of the constant boiling mixture. I employ the term "concentrated HF solutions" to indicate those solutions having a greater content of HF than the constant boiling mixture.

Thorpe's Dictionary of Applied Chemistry, 4th edition, volume 5, page 278 et seq. describes present methods for producing HF. A review of this material shows that the preparation of concentrated and/or anhydrous HF of high purity is not easy and is quite expensive. This literature also shows that the manufacture of HF and other essentially silicon-free compounds has heretofore been based primarily upon the reaction of relatively pure fluorspar and sulphuric acid. Since, as heretofore noted, deposits of high grade fluorspar are being depleted it is now necessary that other sources of basic material be found for the production of these compounds; and hydrofluosilicic acid is a by-product, and in many cases a waste material, of the acidulation of phosphate rock in the fertilizer industry. Hydrofluosilicic acid has heretofore been used to produce fluosilicates employing the reaction:

(1)     

The patent to Buchner No. 1,664,348 discloses a reaction in which $H_2SiF_6$ is reacted with sodium fluoride to prepare an HF solution employing the following reaction:

(2)     

It should be noted, however, that the solution of

HF prepared by this reaction is not a concentrated solution.

The dilute solution of HF of Equation 2 can be concentrated by fractionation to not more than approximately 35% HF. I have found that the dilute HF solution of Formula 2 may be concentrated by the addition of NaF to the solution to precipitate $NaHF_2$, a relatively insoluble compound, according to the following formula:

(3) $\quad NaF + HF \rightarrow NaHF_2 \downarrow$

The $NaHF_2$ is then filtered off, dried and then heated to drive off a gas containing approximately 95% HF according to the formula:

(4) $\quad NaHF_2 + heat \rightarrow NaF + HF \uparrow$

The resulting HF will be anhydrous if the $NaHF_2$ is absolutely dry. I have found that it is not necessary to absolutely dry the $NaHF_2$ if the concentration of the HF gas produced by Formula 4 is higher than that of the constant boiling point mixture since such a concentration can be fractionated to produce essentially anhydrous HF as suggested in U. S. Patent No. 2,018,397.

Other alkali metals than sodium can be used in the above reactions, among these being potassium, but I prefer to use sodium because of the very substantial advantages which it has over the other alkali metals in ease of precipitation, because it is not hygroscopic and for other reasons apparent to those skilled in the art.

The several formulae discussed above may be utilized in an economic commercial process as disclosed in the flow diagram of Fig. 1. In this diagram an 18% $H_2SiF_6$ solution, which is obtained as a by-product from the manufacture of phosphate fertilizer, is taken to an absorption tower 1 where it is treated with a strong $SiF_4$ gas which may be refluxed from a later stage in the process as will more fully appear hereinafter. $H_2SiF$ is formed in absorber 1 having approximately 30% concentration with the precipitation of silica or silicic acid according to the formula:

(5) $\quad 3SiF_4 + 2H_2O \rightarrow 2H_2SiF_6 + SiO_2 \downarrow$

The $SiO_2$ is filtered off and the $H_2SiF_6$ solution is removed to mixer 2 where at least an equivalent amount of solid sodium fluoride (NaF) is added. The NaF may be recycled to mixer 2 from a later stage of the process as will appear more fully hereinafter.

The following reaction takes place in mixer 2:

(6) $\quad 2H_2SiF_6 + 4NaF \rightarrow 2Na_2SiF \downarrow + 4HF$

It should be noted that if too much NaF is added the otherwise free HF will be precipitated as $NaHF_2$. The products of reaction 6 are then taken to filter 3 where the precipitated $Na_2SiF_6$ is separated from the HF solution. The HF solution is taken to mixer 7. The wet $Na_2SiF_6$ is taken from filter 3 to dryer 4 where it is dried and the HF gas and water vapor produced therein are led from dryer 4 to mixer 7. The dried $Na_2SiF_6$ is removed to furnace 5 where it is calcined to produce $SiF_4$. This $SiF_4$ is refluxed through a suitable cooler 6 to absorption tower 1 and the NaF which is produced is refluxed to mixer 2. The reaction taking place in furnace 5 is:

(7) $\quad 2Na_2SiF_6 + heat \rightarrow 4NaF + 2SiF_4 \uparrow$

The HF solution taken from filter 3 and dryer 4 may be passed through suitable stills 16 before admission to mixer 7 to fractionate such solutions to 30–35% HF. Stills 16 are shown as optional in Fig. 1. Where fuel costs are low it is desirable to so fractionate these HF solutions because the resulting yield of $NaHF_2$ will be higher.

The HF solutions from filter 3 and dryer 4, fractionated or not as the case may be, are mixed in mixer 7 with NaF which may be refluxed from a later stage in the process as will more fully appear hereafter. The reaction taking place in mixer 7 is:

(8) $\quad 4NaF + 4HF \rightarrow 4NaHF_2 \downarrow$

The $NaHF_2$ is taken from mixer 7 in the form of a slurry to a suitable filter 8 where the precipitated $NaHF_2$ is removed to a suitable dryer 9. A 3–6% $NaHF_2$ solution is obtained from filter 8. It may be discarded or used for other purposes such as making $Na_2SiF_6$ by the addition of $H_2SiF_6$.

The precipitated $NaHF_2$ is dried in dryer 9 and in dry state constitutes a commercial article. If HF is desired the $NaHF_2$ is taken to calciner 10 where it is calcined to produce a gas containing approximately 95% HF according to the following formula:

(9) $\quad 4NaHF_2 + heat \rightarrow 4NaF + 4HF \uparrow$

The NaF may be recycled back to mixer 7. The approximately 95% HF gas may then be led to rectifier 11 which produces an anhydrous HF and an approximately 40% HF.

In the process described above with reference to the flow diagram of Fig. 1 the concentrations there employed may be varied and if a stronger $H_2SiF_6$ solution is available then the yield will be higher. Room temperatures are employed in the various stages of the process except in the dryers, furnaces, calciners, etc. Recycling of NaF and $SiF_4$ reduces the cost of the operation but it is obvious that NaF and/or $Na_2SiF_6$ must be added to the system to make up for losses.

A modification of the process of Fig. 1 to eliminate a number of steps of the process is possible because $NaHF_2$ decomposes at a lower temperature than $Na_2SiF_6$. Such a modified process is shown in the flow diagram of Fig. 2.

In the process of Fig. 2 the treatment of the $H_2SiF_6$ solution in absorber 1 is identical to that of the process of Fig. 1 and the $H_2SiF_6$ solution is taken to mixer 2 which is similar to the mixer employed in the process of Fig. 1. However, in mixer 2 of the process of Fig. 2 approximately twice as much NaF is added to the $H_2SiF_6$ solution as is added in the process of Fig. 1 and the reaction taking place in mixer 2 is:

(10) $\quad 2H_2SiF_6 + 8NaF \rightarrow 2Na_2SiF_6 \downarrow + 4NaHF_2 \downarrow$ As in the process of Fig. 1, both the $SiF_4$ gas added in absorber 1 and the NaF added in mixer 2 may be refluxed from later stages of the process as will more fully appear hereafter.

The slurry of $Na_2SiF_6$ and $NaHF_2$ produced in mixer 2 is then taken to filter 3 where a 3–6% $NaHF_2$ solution is filtered off as in Fig. 1. The wet $Na_2SiF_6$ and $NaHF_2$ which are separated in filter 3 are then removed to a suitable dryer 4 where they are dried to remove $H_2O$. The dried products of dryer 4 are led to calciner 12 where they are heated to approximately 500° F. At 500° F. $NaHF_2$ will release HF but no $SiF_4$ will be released from the $Na_2SiF_6$ and the HF gas so produced is essentially silica-free. The reaction taking place in calciner 12 is:

(11) $\quad 2Na_2SiF_6 + 4NaHF_2 + heat \rightarrow$
$\quad\quad\quad 2Na_2SiF_6 + 4NaF + 4HF \uparrow$ The HF gas from calciner 12, which is approximately 95% HF, may then be taken to a suitable rectifier 15 to produce a 100% HF and a 40% HF, both of which are commercial products.

The Na₂SiF₆ and the NaF are removed from calciner 12 to a suitable furnace 13 where they are heated to approximately 1200° F. to decompose the Na₂SiF₆ to regenerate NaF for use in mixer 2 and to provide SiF₄ gas for use in absorber 1. The reaction taking place in furnace 13 is:

(12)  $2Na_2SiF_6 + 4NaF + heat \rightarrow 8NaF + 2SiF_4 \uparrow$

The SiF₄ may be led through a suitable cooler 14 before introduction into absorber 1.

By the present invention I have provided a novel process for the production of essentially silicon-free fluorine compounds from hydrofluosilicic acid; that in such process concentrated fluorine compounds are produced from dilute hydrofluoric acid; that concentrated and/or anhydrous HF is produced from hydrofluosilicic acid; that concentrated and/or anhydrous HF is produced from dilute HF; that sodium bifluoride is produced from hydrofluosilicic acid; that sodium bifluoride is produced from dilute HF; and that these compounds are produced from hydrofluosilicic acid without the use of expensive raw materials.

Changes to or modifications of the above described illustrative embodiments of my process may now be suggested to those skilled in the art without departing from my inventive concept. The various temperatures and concentrations employed are illustrative and may be varied. Heat generated in the calciners and furnaces may be employed to preheat and to dry at various stages of the processes. Reference should therefore be had to the appended claims to determine the scope of this invention.

What is claimed is:

1. In a process for obtaining hydrofluoric acid from hydrofluosilicic acid the steps of treating a solution of hydrofluosilicic acid with sodium fluoride to form hydrofluoric acid in solution and precipitate sodium fluosilicate, separating the sodium fluosilicate from the hydrofluoric acid solution, heat treating the sodium fluosilicate to obtain sodium fluoride, cycling the sodium fluoride back to the step of mixing the solution of hydrofluosilicic acid with sodium fluoride, treating the hydrofluoric acid solution with sodium fluoride to precipitate sodium bifluoride, separating the precipitated sodium bifluoride and heat treating the sodium bifluoride to obtain a concentrated hydrofluoric acid.

2. A process as described in claim 1 in which the step of heat treating the sodium fluosilicate to obtain sodium fluoride produces silicon tetrafluoride and includes the step of cycling the silicon tetrafluoride back to the hydrofluosilicic acid solution to produce a more concentrated solution of the hydrofluosilicic acid.

3. A process as defined in claim 2 in which the heat treating of the sodium bifluoride produces sodium fluoride and includes the step of cycling the sodium fluoride back to the step of mixing the hydrofluoric acid solution with sodium fluoride.

4. A process as defined in claim 1 in which the heat treating of the sodium bifluoride produces sodium fluoride and includes the step of cycling the sodium fluoride back to the step of mixing the hydrofluoric acid solution with sodium fluoride.

5. In a process for preparing hydrofluoric acid the steps of treating a solution of hydrofluosilicic acid with an excess of sodium fluoride to precipitate sodium fluosilicate and sodium bifluoride, filtering the mixture of sodium fluosilicate and sodium bifluoride out of solution, and heat treating said mixture to evolve hydrofluoric acid gas from the sodium bifluoride without decomposition of the sodium fluosilicate.

6. The process as described in claim 5 which includes the steps of heat treating the sodium fluosilicate to produce sodium fluoride and silicon tetrafluoride gas, cycling the sodium fluoride to the step of mixing the hydrofluosilicic acid with sodium fluoride and cycling the silicon tetrafluoride gas back to the hydrofluosilicic acid solution to form a more concentrated solution thereof.

7. In a process for obtaining hydrofluoric acid, the steps of treating hydrofluosilicic acid with sodium fluoride, treating the resultant mixture including sodium fluosilicate to remove hydrofluoric acid, heat treating the sodium fluosilicate to produce sodium fluoride and silicon tetrafluoride and cycling the sodium fluoride and silicon tetrafluoride back into the process.

8. In a process for obtaining essentially silicon-free concentrated hydrofluoric acid from hydrofluosilicic acid, the steps of treating a solution of hydrofluosilicic acid with sodium fluoride to form hydrofluoric acid solution and to precipitate sodium fluosilicate, separating the sodium fluosilicate, separating the sodium fluosilicate from the hydrofluoric acid solution, treating the hydrofluoric acid solution with sodium fluoride to precipitate sodium bifluoride, separating the precipitated sodium bifluoride, heat treating the sodium bifluoride to obtain a concentrated hydrofluoric acid and to produce sodium fluoride, and cycling the sodium fluoride back to the step of mixing the hydrofluoric acid solution with sodium fluoride.

ERNEST A. WINTER.

REFERENCES CITED

The following references are of record in the file of this patent:

UNITED STATES PATENTS

| Number | Name | Date |
| --- | --- | --- |
| 1,244,032 | Chappell | Oct. 23, 1917 |
| 1,297,464 | Hechenbleikner | Mar. 18, 1919 |
| 1,367,993 | Stahl | Feb. 8, 1921 |
| 1,664,348 | Buchner | Nov. 27, 1928 |
| 1,903,408 | Soll | Apr. 4, 1933 |
| 1,938,533 | Penfield | Dec. 5, 1933 |
| 2,447,359 | Oakley | Aug. 17, 1948 |

OTHER REFERENCES

"Fluorine Control and Recovery," by Morris, Sutherland and Wright, published in the Canadian Chemistry and Metallurgy, August 1937, pp. 271–274.

"Thorpe's Dictionary of Applied Chemistry," vol. 5, 4th ed., page 282. Longmans, Green & Co., N. Y., publishers.

J. W. Mellor's "A Comprehensive Treatise on Inorganic and Theoretical Chem.," vol. 2, page 516, 1922 ed.; vol. 6, page 944, 1925 ed., Longmans, Green & Co., N. Y., publishers.